(12) United States Patent
Wang et al.

(10) Patent No.: US 8,604,344 B2
(45) Date of Patent: Dec. 10, 2013

(54) CABLE CLAMP

(75) Inventors: Jun-Hui Wang, Shenzhen (CN); Kun Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 139 days.

(21) Appl. No.: 13/337,320

(22) Filed: Dec. 27, 2011

(65) Prior Publication Data

US 2013/0161068 A1    Jun. 27, 2013

(30) Foreign Application Priority Data

Dec. 21, 2011    (CN) .......................... 2011 1 0432346

(51) Int. Cl.
*H01B 7/00*    (2006.01)

(52) U.S. Cl.
USPC ........... 174/135; 439/144; 361/760; 248/74.1

(58) Field of Classification Search
USPC .................... 174/135; 439/144, 372; 361/760; 248/74.1
See application file for complete search history.

(56) References Cited

U.S. PATENT DOCUMENTS 7,304,861 B2 * 12/2007 Takahashi ..................... 361/760

* cited by examiner

*Primary Examiner* — Dhirubhai R Patel
(74) *Attorney, Agent, or Firm* — Altis Law Group, Inc.

(57) ABSTRACT

A cable clamp includes a board and a cover. The board forms a block on a top surface and at a first end of the board, and an L-shaped inserting portion on a bottom surface. A hook extends out from a second end of the board. The cover has a first end pivotably connected to the second end of the board, and a second end detachably engaged with the block.

3 Claims, 3 Drawing Sheets

CABLE CLAMP

BACKGROUND

1. Technical Field

The present disclosure relates to a cable clamp.

2. Description of Related Art

Cable clamps used to bind cables are generally stuck to a sidewall of a computer enclosure with adhesive. However, it is difficult to disengage those cable clamps from the enclosure, and furthermore, the adhesive may be destroyed, and the cable clamps cannot be reused.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
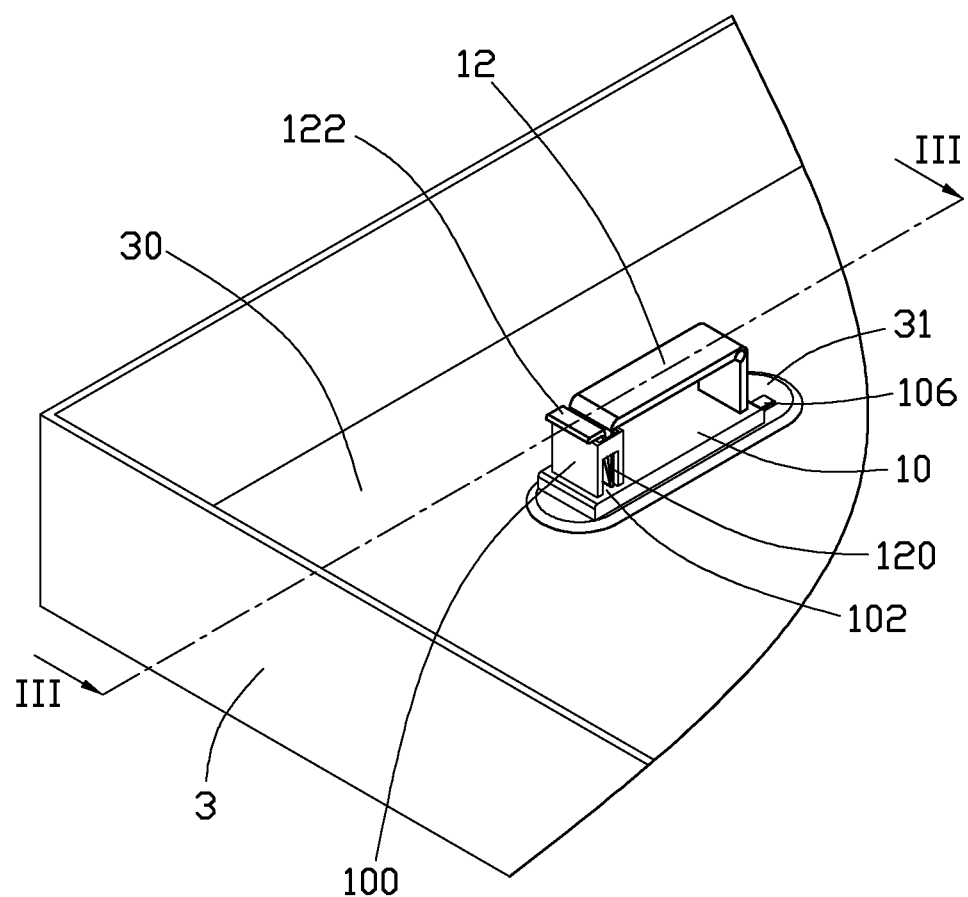
FIG. 1 is an assembled, isometric view of an exemplary embodiment of a cable clamp mounted in a chassis.
Figure 2:
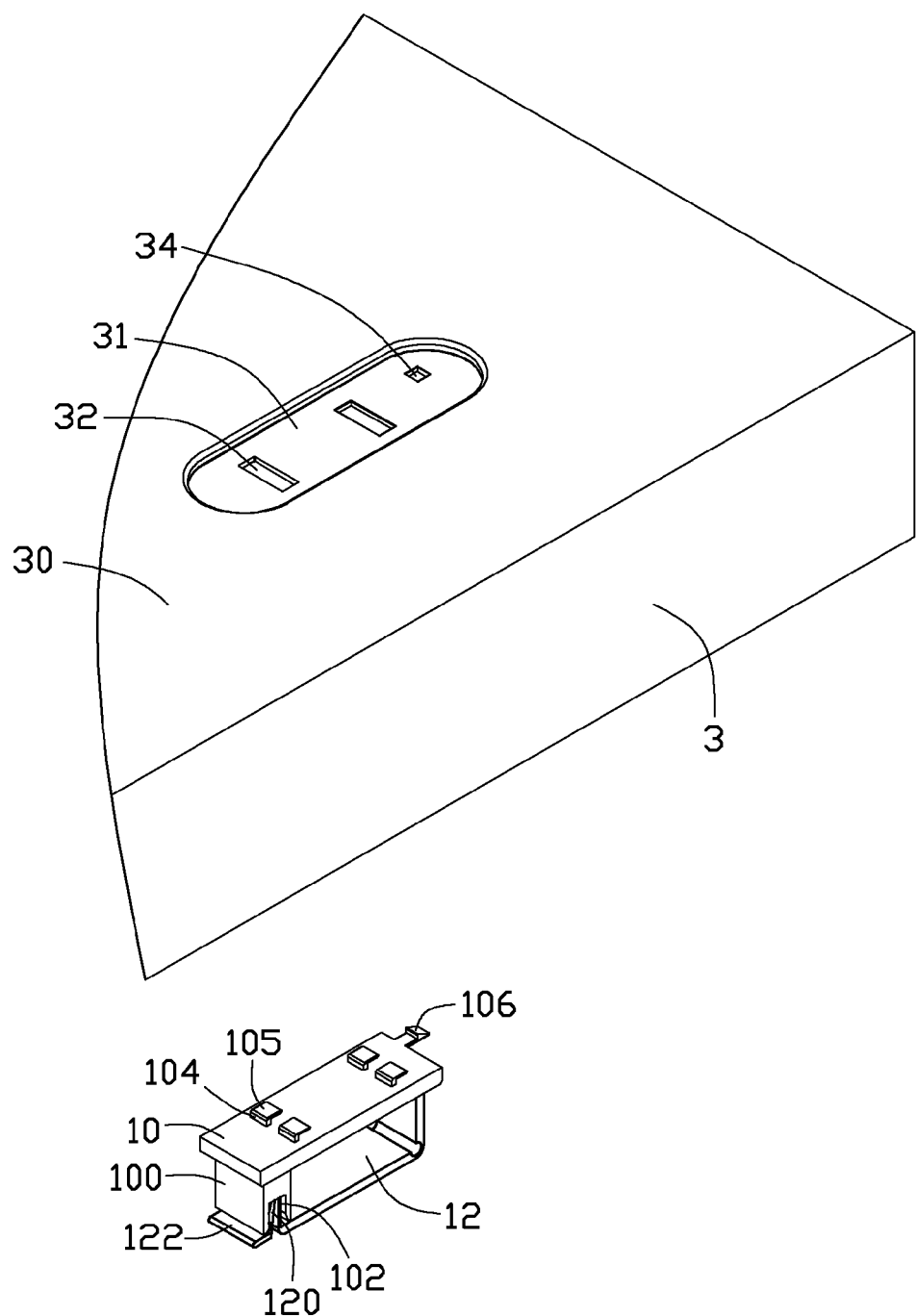
FIG. 2 is an inverted, exploded view of FIG. 1.
Figure 3:
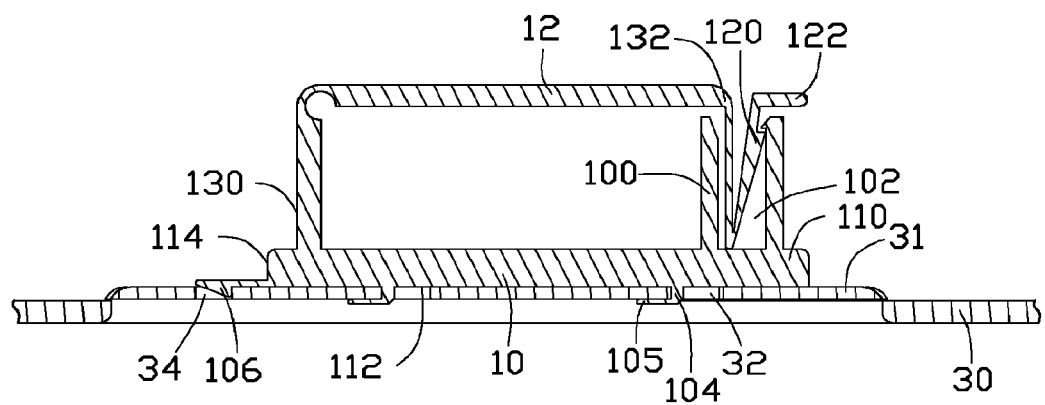
FIG. 3 is a sectional view of FIG. 1, taken along the line of III-III.

FIGS. 1 to 3, show an exemplary embodiment of a cable clamp is mounted in an inner surface of a bottom wall 30 of a chassis 3.

A fixing base 31 extends up from the bottom wall 30. The fixing base 31 defines two parallel slots 32 extending through the inner surface and an outer surface of the bottom wall 30, and a through hole 34 adjacent to one of the slots 32.

The cable clamp includes a board 10 and a U-shaped cover 12 extending up from the board 10 for binding cables (not shown).

A block 100 is formed on a first end 110 of a top surface of the board 10, and defines a receiving space 102 in a top surface of the block 100. Two parallel rows of L-shaped inserting portions 104 are formed on a bottom surface 112 of the board 10, each row including two inserting portions 104. Each inserting portion 104 extends down from the board 10 and then is bent toward a second end 114 of the board 10 opposite to the first end 110, to form an extension piece 105. A hook 106 extends out from the second end 114 of the board 10.

The cover 12 has a first end 130 pivotably connected to the second end 114 of the top surface of the board 10, and a second end 132 forming a V-shaped latch 120 to be engaged in the receiving space 102. An operation portion 122 extends out from a distal end of the latch 120 opposite to the block 100 for conveniently disengaging the latch 120 from the receiving space 102.

Referring to FIG. 3, in assembly, every two juxtapositioned extension portions 105 are extended through a corresponding slot 32, until the hooks 106 align with the through hole 34. The extension portions 105 are engaged with a bottom of the fixing base 31. The hook 106 is pressed to be engaged in the through hole 34, to fix the cable clamp to the fixing base 31.

In disengaging the cable clamp from the chassis 3, the hook 106 is taken out from the through hole 34, the cable clamp is then slid away from the through hole 34, until the extension portions 105 disengage from the corresponding slots 32.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. An assembly, comprising:
   a bottom wall defining a slot and a through hole; and
   a cable clamp comprising:
      a board forming a block on a top surface and at a first end of the board, and an L-shaped inserting portion on a bottom surface to be extended through the slot and engaged with the bottom wall, a hook extending out from a second end of the board opposite to the first end to be engaged in the through hole; and
      a cover having a first end connected to the second end of the board, and a second end detachably engaged with the block.

2. The assembly of claim 1, wherein the block defines a receiving space in a top surface, the cover is U-shaped with the first and second ends of the cover being the two distal ends of the U, a latch is formed on the second end of the cover to be engaged in the receiving space.

3. The assembly of claim 2, wherein the latch is V-shaped, an operation portion extends out from the latch.

* * * * *